United States Patent Office 3,632,489
Patented Jan. 4, 1972

---

3,632,489
ELECTROCHEMICAL INTRODUCTION OF NITROGEN AND OXYGEN FUNCTIONS INTO OLEFINIC COMPOUNDS
Norman Louis Weinberg, 104 Rolling Wood Drive, Stamford, Conn. 06905, and Arthur Kentaro Hoffmann, 50 Summit Ridge Road, New Canaan, Conn. 06840
No Drawing. Filed Apr. 24, 1969, Ser. No. 819,117
Int. Cl. C07b 29/06, 9/00
U.S. Cl. 204—72          13 Claims

ABSTRACT OF THE DISCLOSURE

Method for producing vinyl and 1,2-addition products of olefinically unsaturated organic compounds by a reaction with a catalytic amount of a halogen in the presence of a nucleophilic agent, and regeneration of the halogen catalyst electrochemically.

---

This invention relates to a method for preparing addition products of olefinically unsaturated organic compounds. It further relates to such a method where the olefinic bond is mono- or bifunctionalized.

It is known to prepare addition products of olefins by the use of silver salts by the Prevost reaction as described in Organic Reaction, vol. IX, 332(1957), such as the preparation of trans - 1-iodo-2-acetoxy-cyclohexane and trans-1,2-diacetoxy-cyclohexane from cyclohexene, silver acetate and iodine. It is also known to react olefins with cuprous chloride, sodium acetate and palladium in acetic acid solution as described in The Journal of Organic Chemistry, 32, 2575 (1967).

However, the above processes suffer from the disadvantage that they require the use of expensive metals as reagents.

It is therefore an object of this invention to provide an inexpensive method for obtaining addition products of olefinically unsaturated organic compounds.

This and other objects of this invention will become more apparent as the description thereof proceeds.

The invention comprises the anodic electrolysis of a suitable conducting halide salt such as KI, KCl, NaBr, Et$_4$NI or the elemental halogen itself in the presence of a suitably conducting electrolyte such as inorganic or quaternary ammonium salts, such as LiClO$_4$, NaClO$_4$, LiBF$_4$, NaPF$_6$, (CH$_3$)$_4$NBF$_4$, Et$_4$NBF$_4$, ($n$Bu)$_4$NNO$_3$ or ($n$Bu)$_4$NClO$_4$ in the presence of an olefinic compound. In acetonitrile solution an iodoamide is formed by interaction of the iodonium intermediate with solvent. With alcohols or carboxylic acids, ethers or carboxylates are produced. The method is inexpensive compared to the present chemical routes which require the use of expensive reagents such as silver salts and halogens. In this invention the halogen is generated by electrolysis of a halide salt and no silver salts are required.

These reactions probably proceed in the manner depicted in the following equations:

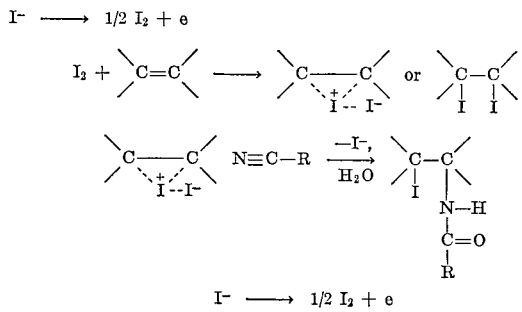

In the case of a negatively substituted olefin:

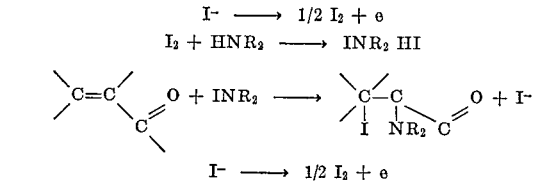

R is a residue which aids nucleophilic activity towards the intermediate halo- or halonium compounds of the reaction scheme.

Typical nucleophilic species may be nitrogen sources other than acetonitrile or amines. These are for example other nitriles including propionitrile, acrylonitrile, and benzonitrile, and nitrogen sources such as amides (i.e., urethane), hydrogen cyanide, and hydrazines. Introduction of oxygen from sources such as alcohols, phenols and enols may also be effected. Also, the formation of sulfides from mercaptans, sulfonium salts from sulfides, phosphonium and arsonium salts from phosphines and arsines may be effected. Thus, additional nucleophiles are derivatives of P, As, S, Se, and Te.

For the production of glycol esters, as exemplified by the reaction of ethylene in acetic acid containing potassium acetate, the steps are believed to be as follows:

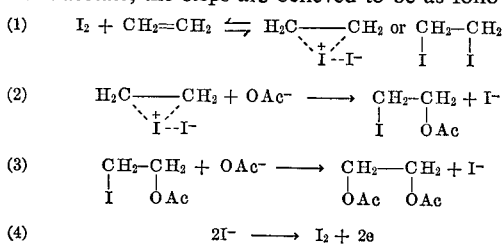

(4)         2I$^-$ ⟶ I$_2$ + 2e

The formation of the glycol diacetate very likely proceeds through a cyclic acetoxonium ion intermediate derived from iodoethyl acetate. The same acetoxonium species is also believed to decompose to vinyl acetate under suitable conditions as follows:

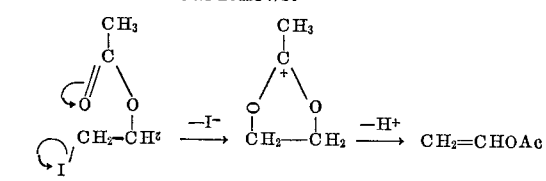

Stoichiometric quantities of the halogens (such as I$_2$, Cl$_2$, F$_2$ or Br$_2$) are not required, nor are expensive silver salts for the purpose of removing halide ion. Anodic oxidation of the halide provides the halogen and no halogen is wasted since any reaction-generated halide is reconverted electrochemically to halogen which may re-enter the process.

A variety of useful synthetic materials from olefinic compounds may be produced. The products produced in the electrolysis may be amides, amines, aziridines, isocyanates, azides, nitroalkanes, oxazolines, ethers, etc., all having a carbon-nitrogen or carbon-oxygen bond formed in the electrolysis. Moreover, in a number of cases an iodo, bromo, chloro or fluoro group is simultaneously introduced which may be readily reduced or acted upon to provide a further range of substituted materials.

All ordinary olefins and those bearing electro-negative groups (i.e., CO, CO$_2$, CN, NO$_2$, etc.) undergo the electrochemical process whereby nitrogen is introduced. Thus with negatively substituted olefins and in the presence of a suitable amine such as morpholine, dimorpholinization of the carbon-carbon double bond may occur. With a primary or secondary amine, substituted aziridines are formed. Because of the relatively low anode potentials required to discharge halogen, a variety of solvents such as acetonitrile, dimethylformamide, dimethylsulfoxide, methylene chloride, and the like may be employed. A variety of anode and cathode materials such as nickel, lead, copper, carbon, platinum, iron, and the like, are also suitable.

Thus the starting material may be any alkene; typical examples include ethylene, propylene, butene-1, isobutylene, hexene-1, isooctene, triisobutylene, butadiene, styrene, p-chlorostyrene, allylacetate, allyl benzene, ethyl acrylate, octadecene-1, butene-2, pentene-2, pentene-3, hexadiene-1,5 and the like, and mixtures thereof.

The free organic acid containing from 1 to 18 carbon atoms, that reacts with the unsaturated compounds may be formic, acetic, chloroacetic, phenyl acetic, propionic, isobutyric, benzoic, p-toluic, lauric, palmitic, stearic and the like, and mixtures thereof. Dicarboxylic acids such as adipic acid may also be employed.

The iodine is required in only catalytic amounts since it is being continuously regenerated and reused during the process. This amount may be from 0.05 to 10 weight percent, preferably from 0.1 to 5 weight percent.

The alkylene compounds and nucleophilic agents may be used in widely varying ratios, for example, from 5 to 85 weight percent of alkylene compound and from 5 to 60 percent of nucleophilic agent.

The reaction may be conducted over a wide range of temperature and pressure. The temperature may vary from room temperature to about 350° C., preferably from 50° C. to 250° C. The pressure may be from atmospheric to elevated for example, up to 2000 p.s.i.

GENERAL PROCEDURE

A divided electrolysis cell (separated by sintered glass, porcelain or other suitable membrane) was fitted with a Pt anode (graphite in its various forms, gold, nickel, etc., also suitable) of about 10 cm.$^2$ and a reference electrode Ag, Ag$^+$ (0.01 M) introduced close to the anode separated by a second sintered glass division was found suitable for aprotic solvents such as acetonitrile, while the saturated calomel electrode (SCE) functioned well in protic media such as methanol. The counter electrode consisted of any one of a number of suitable metals including Pt, Hg, Ni, Pb, Al, etc. The three electrode system was connected to a suitable potentiostat and power supply in the usual arrangement for controlled potential electrolyses (arrangements for constant voltage or constant current electrolysis without a reference electrode are also suitable in these electrolyses since the discharge of the halide is potential controlling). The olefin, halide salt or halogen, and the solvent containing the electrolyte (halide salts, perchlorates, etc., are suitable) was introduced into the anode chamber, while the cathode chamber was charged with the same concentration of electrolyte in the same solvent (although this is not necessary). The electrolysis was then conducted with the anode potential set (vs. the reference) at a value above the discharge potential of the halide, but below the known oxidation regions where solvent, electrolyte, or olefin are oxidized by direct discharge of electrons to the anode. After close to the theoretical amount of current had been passed, the solution in the anode compartment was concentrated in vacuo and the product isolated by extraction of the residue (dissolved in water) with any suitable solvent. In some cases, the reaction product precipitated as formed and could be removed by filtration.

EXAMPLE I

Iodoamidation of cyclohexene

A solution consisting of 3.2 g. iodine and 10 ml. of cyclohexene in 100 ml. of acetonitrile containing LiCl$_4$ (0.5 M) was electrolyzed at 0.3 v. vs. Ag, Ag$^+$ (0.01 M) in the usual divided cell at Pt anode (10 cm.$^2$). After 2430 coulombs had been passed, the almost colorless anolyte was concentrated in vacuo at 35° C., the residue taken up in chloroform, washed with water, 10% aqueous Na$_2$S$_2$O$_3$, once more with water, the organic layer dried over MgSO$_4$, filtered, and the filtrate concentrated, giving 6.6 g. of crude product (200% based on iodine). After several recrystallizations the solid had a melting point of 118–120.5° C. and was identical to an authentic sample of trans-1-iodo-2-acetamidocyclohexane (Tetrahedron Letters, 3119 (1966)).

EXAMPLE II

Iodoamidation of 1-phenyl-2-butene

Using the procedure of Example I on an 0.01 mole scale for olefin and Et$_4$NI and with a cpe. at 0.5 v. vs. Ag, Ag$^+$, 1.9 g. (51%) of 1-phenyl-2-iodo-3-acetamidobutane, M.P. 182–4° C. was obtained after 1,800 coulombs had transpired. IR and NMR analyses were in agreement with the structural designation, including acetone of crystallization.

Analysis.—Calcd. for $C_{12}H_{16}NIO \cdot C_3H_6O$ (percent): C, 48.00; H, 5.87; N, 3.70; I, 33.87. Found (percent): C, 48.23; H, 6.00; N, 3.61; I, 33.82.

EXAMPLE III

Bromoamidation of 1-phenyl-2-butene

In a similar manner as in Example II, cpe. at 1.3 v. vs. Ag, Ag$^+$ on a 0.01 mole scale gave 2.26 g. of crude product after 1214 coulombs. This material showed strong amide absorption bands in the IR. A solid slowly deposited and recrystallization from diethyl ether-acetone provided 0.35 g. (12%) of 1-phenyl-2-acetoxy-3-aminobutane hydrobromide, M.P. 184–6.5° C.

Analysis.—Calcd. for $C_{12}H_{18}NBrO_2$ (percent): C, 49.85; H, 6.27; N, 4.67; Br, 27.70. Found (percent): C, 50.00; H, 6.25; N, 4.86; Br, 27.70.

On distillation, the mother liquors provided 0.19 g. (31%) of 1-phenyl-2,3-dibromobutane (B.P. 90° C., 0.15 mm.). The latter was identical (IR) to a sample of dibromide prepared by this usual chemical method.

Analysis.—Calcd. for $C_{10}H_{12}Br_2$ (percent): C, 41.1; H, 4.11; Br, 54.8. Found (percent): C, 40.36; H, 4.08; Br, 54.80.

EXAMPLE IV

Chloroamidation of 1-phenyl-2-butene

A solution of 0.02 mole of Et$_4$NCl and 0.01 mole of olefin in 100 ml. of 0.5 M LiClO$_4$-acetonitrile was electrolyzed as in Example II at 1.2–1.3 v. vs. Ag, Ag$^+$ until 2000 coulombs had been passed. Work-up gave 0.35 g. (15%) of colorless solid identified (IR, NMR) as 1-phenyl-2-chloro-3-acetamidobutane, M.P. 122–4° C. (from cyclohexane-acetone).

Analysis.—Calcd. for $C_{12}H_{16}NOCl$ (percent): C, 63.7; H, 7.08; N, 6.19; Cl, 15.7. Found (percent): C, 63.88; H, 7.16; N, 6.24; Cl, 15.83.

The mother liquors provided a small amount of oil whose IR spectrum showed that it was probably 1-phenyl-2,3-dichlorobutane contaminated with starting material.

EXAMPLE V

Dimorpholinization of trans-1,2-dibenzoylethylene

A solution of 2.4 g. of trans-1,2-dibenzoylethylene, 1.3 g. Et$_4$NI and 4 ml. of morpholine in 100 ml. of 0.5 M LiClO$_4$ in acetonitrile was electrolyzed at 0.35 v. vs. Ag, Ag$^+$. After 1990 coulombs, the solid which had precipitated during the course of the reaction was filtered off and crystallized from methanol giving 1.6 g. (37%) of yellow crystals, M.P. 180–183° C. for 1,2-dibenzoyl-1,2-dimorpholinoethane. This was identical in all respects to a sample prepared according to the literature (J. Am. Chem. Soc., 75, 629 (1953)).

From the mother liquors a second solid was obtained which was recrystallized twice from methanol and benzene, M.P. 131–4° C. (decomp.). The NMR spectrum indicated that the material could be impure 1,2-benzoyl-1-morpholino-2-iodoethane.

*Analysis.*—Calcd. for $C_{20}H_{20}NO_2I$ (percent): C, 57.00; H, 4.77; N, 3.34; I, 30.3. Found (percent): C, 53.89; H, 4.52; N, 3.26; I, 21.86.

EXAMPLE VI

Iodoacetoxylation of cyclopentene

A solution of 30 ml. of cyclopentene and 3 g. $I_2$ in 3 M KOAc in HOAc (containing 5% acetic anhydride) was electrolyzed in the divided cell at Pt electrodes. The anode compartment was heated at 50° C. and magnetically stirred. A reference electrode of Ag/AgOAc (satd.) was isolated from the anode (Pt, 12 cm.²) by means of two fitted glass separations. A CPE was carried out at 1.4 v. vs. Ag/AgOAc (satd.). The Ag/AgOAc reference is +0.42 v. vs. SCE. The initial current was 60 ma. and this fell to 20 ma. after 24 hours and passage of 2260 coulombs. The anolyte was worked up as before leaving 5.1 g. of oil of composition as follows (VPC on SE–30/glass beads):

| | Percent yield (based on $I_2$) |
|---|---|
| Low boiling material. | |
| 1-hydroxy-2-acetoxycyclopentane | 26 |
| 1,2-diacetoxycyclopentane | 8 |
| 1-iodo-2-acetoxycyclopentane | 141 |

The NMR spectra of the three samples separated by preparative VPC were entirely consistent with the proposed structures.

EXAMPLE VII

Iodoacetoxylation of cyclohexene

A solution consisting of 100 ml. of glacial acetic acid containing 3.0 M KOAc was placed in the anode compartment of the divided cell (the catholyte had this composition also) at room temperature. The anode chamber was also charged with 3 g. and 10 ml. of cyclohexene and a cpe. carried out as before at 0.4 v. vs. Ag/AgOAc (satd.). The current dropped from 68 ma. to 20 ma. overnight giving a total of 2072 coulombs whereupon the electrolysis was discontinued.

Work-up as before gave 3.7 g. of a heart-cut, B.P. 60–70° C. 0.1 mm. VPC showed the following composition:

| | Percent yield (based on $I_2$) |
|---|---|
| Low retention material. | |
| 1-hydroxy-2-acetoxycyclohexane | 22 |
| 1,2-diacetoxycyclohexane | 2 |
| 1-iodo-2-acetoxycyclohexane | 85 |

EXAMPLE VIII

Under the same conditions as in Example VII, but at reflux the product was predominantly 1,2-diacetoxycyclohexane.

EXAMPLE IX

Iodoacetoxylation of propylene

A solution of 100 ml. of glacial acetic acid containing 0.5 M $I_2$ and 10 g. KOAc was saturated with propylene gas and electrolyzed in the divided cell (frit-separation) at Pt (12 cm.²) electrodes. A constant current of 0.5 amp was passed at 15–20 v. for 6 hours at 20° C. On work-up as above, 1.7 g. of oil was obtained. The NMR spectrum of a heart-cut (B.P. 68° C., 10 mm.) indicated that the product was mainly 1-iodo-2-acetoxypropane, containing about 12% of 1,2-diacetoxypropane.

EXAMPLE X

Bromomethoxylation of 1-phenyl-2-butene

A mixture of 4.2 g. (0.020 mole) of $Et_4NBr$ and 2.64 g. (0.020 mole) of 1-phenyl-2-butene was electrolyzed in 100 ml. of 0.5 M $NaClO_4$ in methanol in the described divided cell. Pt electrodes (10 cm.²) were used at a cpe.

of 0.9 v. vs. SCE. Only ¾ of the theoretical current could be passed before the current had fallen to near zero. The solvent was evaporated, the residue taken up in 100 ml. of water, extracted with 3×50 ml. of ether, the combined ether extract dried over $MgSO_4$, filtered and concentrated gave 4.55 g. of crude product. VPC analysis showed about 1% of very low retention material (ether), followed by four peaks. Two of these were identified as starting olefin (27%) and olefin dibromide (20%) by comparison of retention times with authentic material. The two other products were separated preparatively and shown to be the diether (XIX) in 20% and the bromohydrin ether XX in 38% yield. Both were identified by mass spectrometry while, in addition, microanalysis of the latter was consistent with the structural assignment.

*Analysis.*—Calcd. for $C_{12}H_{15}BrO$ (percent): C, 56.5; H, 6.0; Br, 31.3. Found (percent): C, 56.0; H, 6.24; Br, 28.2.

EXAMPLE XI

Formation of cyclohexenyl acetate

The procedure of Example VIII was followed except that the electrolyte was 0.5 M $(nPr)_4NBF_4$. Work-up as before gave a crude oily residue, the VPC of which showed the presence of cyclohexenyl acetate including minor amounts of the components listed under Example VII.

While we have set forth certain specific embodiments and preferred modes of practice of the invention, this is solely for illustration, and it will be understood that various changes and modifications may be made in the invention without departing from the spirit of the disclosure and the scope of the appended claims.

What is claimed is:

1. A method of producing vinyl and 1,2-addition products from olefinically unsaturated compounds comprising the anodic electrolysis of a halide salt or elemental halogen in an electrolyte solution forming a halo or halonium intermediate by reaction of the electrolysis product with an olefinically unsaturated compound in said solution and further reacting such intermediate with a nucleophilic agent present in the same electrolyte solution.

2. The method of claim 1 wherein elevated temperatures are used.

3. The process of claim 1 wherein said olefinically unsaturated compounds is an alkylene compound.

4. The process of claim 3 wherein said alkylene is lower alkylene.

5. The process of claim 1 wherein said olefinically unsaturated compound is a cyclic compound.

6. The process of claim 1 wherein said nucleophilic compound is an oxygen containing organic compound.

7. The process of claim 1 wherein said nucleophilic compound is a nitrogen containing organic compound.

8. The process of claim 1 wherein said nucleophilic agent is one having an acetic acid moiety.

9. The process of claim 8 wherein said nucleophilic agent is potassium acetate in acetic acid.

10. The process of claim 1 wherein said halogen is iodine.

11. The process of claim 1 wherein said halogen is in the form of its salt.

12. The process of claim 1 wherein said unsaturated compound is electronegatively substituted.

13. The method of claim 1 wherein elevated pressures are used.

References Cited

Organic Chemistry, by Brewster, 3rd ed., pp. 71–72.

JOHN H. MACK, Primary Examiner

R. L. ANDREWS, Assistant Examiner

U.S. Cl. X.R.

204—81